United States Patent [19]
Ikeda et al.

[11] Patent Number: 5,594,198
[45] Date of Patent: Jan. 14, 1997

[54] DEVELOPING DEVICE USING ONE-COMPONENT TYPE DEVELOPER

[75] Inventors: Masae Ikeda; Teturou Nakashima, both of Kawasaki, Japan

[73] Assignee: Fujitsu Limited, Kawasaki, Japan

[21] Appl. No.: 444,098

[22] Filed: May 18, 1995

[30] Foreign Application Priority Data

May 18, 1994 [JP] Japan .................................. 6-103534
Apr. 27, 1995 [JP] Japan .................................. 7-104162

[51] Int. Cl.$^6$ ........................................... G03G 15/08
[52] U.S. Cl. ........................................ 399/281; 399/286
[58] Field of Search .................................. 355/200, 245, 355/259, 260; 118/653, 661

[56] References Cited

U.S. PATENT DOCUMENTS

| | | | |
|---|---|---|---|
| 4,903,634 | 2/1990 | Ono et al. | 118/653 |
| 4,930,438 | 6/1990 | Demizu et al. | 118/653 X |
| 5,077,578 | 12/1991 | Grammatica et al. | 355/259 |
| 5,132,734 | 7/1992 | Momiyama et al. | 355/245 X |
| 5,166,472 | 11/1992 | Maeda et al. | 118/653 |
| 5,177,323 | 1/1993 | Kohyama | 118/653 |
| 5,317,370 | 5/1994 | Kohyama et al. | 355/245 |
| 5,333,040 | 7/1994 | Imamiya | 118/661 X |

*Primary Examiner*—Sandra L. Brase
*Attorney, Agent, or Firm*—Armstrong, Westerman, Hattori, McLeland & Naughton

[57] ABSTRACT

A developing device is used to develop an electrostatic latent image with a one-component type developer, the latent image being formed on a photosensitive body. The device has a developing roller made of a conductive rubber, and a conductive sponge roller engaged with the developing roller to feed the developer to the developing roller. The rollers are rotated in the same direction, and the developer fed to a nip between the rollers is subjected to triboelectrification by the rollers, whereby the developer is electrically charged. The charged developer is electrostatically adhered to the surface of the developing roller due to an electrostatic image force acting therebetween. The sponge roller has a friction plate associated therewith, for effectively and additionally charging the developer. Also, the developing roller has a developer-removing plate associated therewith, for removing residual developer, not used for development of latent images, from the developing roller.

10 Claims, 8 Drawing Sheets

DEVELOPING DEVICE USING ONE-COMPONENT TYPE DEVELOPER

BACKGROUND OF THE INVENTION

1. Field of the Invention

The present invention relates to a developing device incorporated in an image forming apparatus, such as a copying machine, a laser printer, a facsimile or the like, and more particularly relates to a developing device for developing an electrostatic latent image with a one-component type developer, the latent image being formed on an electrostatic latent image carrying body, such as a photosensitive body, a dielectric body, or the like.

2. Description of the Related Art

Generally, in an image formation apparatus, such as an electrophotographic recording apparatus, an electrostatic latent image is formed on an electrostatic latent image carrying body, such as a photosensitive body or a dielectric body; the latent image is electrostatically developed, as a charged toner image, with a developer; the charged toner image is electrostatically transferred from the electrostatic latent image carrying body to a recording medium, such as a sheet of paper; and then the transferred toner image is fixed on the recording medium by heat, pressure, light, or the like. As one type of developer, a two-component type developer is well known, which is composed of a toner component (fine particles of colored synthetic resin) and a magnetic component (fine magnetic carriers).

Usually, a developing device using this type of developer includes a vessel for holding the two-component type developer, wherein the developer is agitated by an agitator provided therein, to thereby cause the toner particles and the magnetic carriers to be subjected to triboelectrification, and thus the toner particles electrostatically adhere to each of the magnetic carriers. The developing device also includes a magnetic roller provided in the vessel as a developing roller, in such a manner that a portion of the magnetic roller is exposed therefrom and faces the surface of the electrostatic latent image carrying body. The magnetic carriers with the toner particles are magnetically adhered to the surface of the magnetic roller to form a magnetic brush therearound, and, by rotating the magnetic roller carrying the magnetic brush, the toner particles are brought to a nip zone, or developing zone, between the magnetic roller and the electrostatic latent image carrying body for development of an electrostatic latent image formed thereon. Namely, the magnetic component of the two-component type developer performs the two functions of electrically charging the toner component of the developer, and of bringing the toner particles to the developing zone.

The developing device using the two-component type developer has a good ability to bring the toner particles to the developing zone, which affects the quality of a developed toner image. Nevertheless, the ratio between the toner and magnetic components must be kept within a predetermined range before the ability to bring the toner particles to the developing zone can be ensured. Namely, since the toner component of the developer is gradually consumed during the developing process, a toner component should be periodically supplemented to the body of developer held in the vessel. Furthermore, when the magnetic component of the developer is deteriorated, the body of developer held in the vessel must be exchanged with a new one before a proper development of an electrostatic latent image can be obtained. In short, this type developing device has the disadvantages of a cumbersome control of a suitable component ratio in the developer, and a cumbersome exchange of a deteriorated developer with a new one.

Recently, a one-component type developer composed of only a toner component (fine particles of colored synthetic resin) has become favored because the disadvantages involved in the use of the two-component type developer can be eliminated by the use of the one-component type developer. Nevertheless, in the use of a one-component type developer, especially, a non-magnetic one-component type developer, it is difficult to decide how the toner should be electrically charged, and how the charged toner should be brought to a zone for developing an electrostatic latent image.

As a representative of developing devices using the one-component type developer, a known developing device comprises a vessel for holding the one-component type developer, a developing roller formed of a suitable conductive rubber material and provided within the vessel, and a developer-feeding roller formed of a suitable conductive sponge material and disposed in the vessel to be in engagement with the developing roller. A portion of the developing roller is exposed from the vessel, and faces an electrostatic latent image carrying body, such as a photosensitive drum, so as to form a developing zone therebetween. The developing roller and the developer-feeding roller are rotated in the same direction so that the surfaces thereof rub against each other in opposite directions at the nip therebetween. The rotating surface of the developer-feeding roller entrains toner particles and feeds the same to the nip between the developing roller and the developer-feeding roller, and the fed toner particles are subjected to triboelectrification so that they are electrically charged. The charged toner particles are electrostatically adhered to the rotating surface of the developing roller due to the image forces acting therebetween, to thereby form a developer layer therearound, and then the developer layer is brought to the developing zone for development of an electrostatic latent image formed on the photosensitive drum. The developer also comprises a doctor blade member resiliently pressed against the surface of the developer roller to even out the thickness of the developer layer to thereby ensure an even development of the latent image.

The above-mentioned conventional developing device using the one-component type developer involves various issues to be resolved, as discussed below:

(a) During the developing process, toner particles having a smaller diameter are preferentially consumed from the developer held in the vessel, resulting in variation in a quality of a developed toner image. In particular, the one-component type developer is composed of toner particles having various diameters. For example, when the one-component type developer is composed of toner particles having an average diameter of 8 µm, this means that the developer includes smaller toner particles having a diameter of less than 8 µm, and larger toner particles having a diameter of more than 8 µm. In fact, a marketable one-component type developer having an average diameter of 8 µm even includes toner particles having less than 5 µm, and toner particles having a diameter of more than 10 µm. When the toner particles are fed to the nip between the developing roller and the developer-feeding roller, the smaller toner particles are susceptible to triboelectrification, whereas the larger toner particles are not susceptible to triboelectrification. Accordingly, the smaller toner particles are more strongly adhered to the developing roller than the larger toner particles. When the thickness of the developer layer is regulated by the doctor blade member, the smaller toner particles, or sufficiently-charged toner particles, can pass a gap between the developing roller and the doctor blade, but the larger toner particles, or insufficiently-charged toner particles, are easily removed from the developing roller by the doctor blade member due to the weakness of the image forces acting therebetween. The removed toner particles are returned to the body of developer held in the vessel, and thus an average diameter of toner particles included therein gradually becomes larger. Thus, in the case where a new fresh developer is loaded in the vessel, a definition of an earlier-developed toner image is superior to that of a later-developed toner image, because very fine toner particles are used in the earlier-developed toner image. Namely, in the conventional developing device a constant definition or quality of a developed toner image cannot be ensured due to the preferential consumption of the smaller toner particles.

(b) During the developing process, some toner particles are fused and stuck to the doctor blade member, and thus a proper regulation of a thickness of the developer layer cannot be ensured due to the toner adhered to the doctor blade member. In particular, although it is explained in Item (a) that the larger toner particles are removed from the developing roller, a very small part of the larger toner particles can pass the gap between the developing roller and the doctor blade member, but a majority of the toner particles passing the gap stay in a small space defined by the doctor blade member and the rotating surface of the developing roller, without being brought to the developing zone. The toner particles staying in the small space are fused due to the friction between the doctor blade member and the developing roller, and the fused toner is stuck to the doctor blade.

(c) When an electrostatic latent image pattern, except for a character latent image, such as an alphabet image, a numerical image, a symbol image, or the like, is developed as a solid-image pattern or a halftone-dot-image pattern, a developing hysteresis appears in the developer layer formed around the developing roller. The developing hysteresis may be defined as an unevenness of a density of toner particles produced in the developer layer in accordance with a shape of a developed solid-image pattern or a developed halftone-dot-image pattern. The appearance of the developing hysteresis results in an occurrence of the earlier-developed image pattern as a ghost pattern in a later-developed toner image pattern. Of course, the occurrence of the ghost pattern deteriorates the quality of the later-developed toner image pattern.

(d) When a local area of the developer layer does not participate in development of electrostatic latent images during the developing process, i.e., when any toner particles are not consumed from the local area of the developer latent image, the toner particles included in the local area are stuck as a film to the surface of the developing roller, because the toner particles concerned are repeatedly subjected to triboelectrification, and are strongly adhered to the developing roller with the large image force. A coefficient of friction of the toner-film-stuck surface of the developing roller becomes smaller, the toner particles cannot be sufficiently subjected to triboelectrification between the developer-feeding roller and the toner-film-stuck surface of the developing roller, and thus a sufficient amount of toner particles cannot be brought to the developing zone, to thereby deteriorate the quality of a developed toner image.

SUMMARY OF THE INVENTION

Therefore, an object of the present invention is to provide a developing device using a one-component type developer, which is constituted such that a preferential consumption of smaller toner particles from a body of developer and a sticking of toner particles to a doctor blade member, as discussed above, can be improved or avoided.

Another object of the present invention is to provide a developing device using a one-component type developer, which is constituted such that the appearance of a developing hysteresis in a developer layer of a developing roller and a formation of a film of toner particles on a surface of a developing roller, as discussed above, can be improved or avoided.

Yet another object of the present invention is to provide a developing device using a one-component type developer, which is constituted such that all of the preferential consumption of smaller toner particles from a body of developer, stickiness of toner particles to a doctor blade member, developing hysteresis in a developer layer of a developing roller, and formation of a film of toner on a developing roller can be improved or avoided.

In accordance with a first aspect of the present invention, there is provided a developing device for developing an electrostatic latent image with a one-component type developer, the electrostatic latent image being formed on an electrostatic latent image carrying body, the developing device comprising: a vessel for holding the one-component type developer; a developer carrying body formed of a conductive material and rotatably provided in the vessel such that a portion of the developer carrying body is exposed therefrom and faces the electrostatic latent image carrying body so as to form a developing zone therebetween, the one-component type developer being adhered to a rotating surface of the developer carrying body by an electrostatic image force to be brought to the developing zone; a developer-feeding body formed of a conductive material and rotatably provided in the vessel so as to feed the one-component type developer to the developer carrying body, the developer-feeding body being in frictional engagement with the developer carrying body such that the one-component type developer fed thereto is subjected to triboelectrification therebetween; and a friction means engaged with the developer-feeding body such that the one-component type developer fed to the developer carrying body by the developer-feeding body is subjected to triboelectrification therewith.

In this developing device, the developer-feeding body may be formed as a developer-feeding roller, and the friction means may be formed as a metal-plate friction spring, which is at least partially curved to be fitted to the developer-feeding roller, and which is resiliently pressed thereagainst. Preferably, the metal-plate friction spring has a plurality of openings formed therein, and the openings are uniformly arranged along a longitudinal axis of the developer-feeding roller. The metal-plate friction spring may have a curvature somewhat smaller than that of the developer-feeding roller. Preferably, the friction means is electrically conductive, and is connected to an electrical power source so as to be given a predetermined potential, to thereby direct the one-component type developer from the friction means to the developer-feeding body.

In accordance with a second aspect of the present invention, there is provided a developing device for developing an electrostatic latent image with a one-component type developer, the electrostatic latent image being formed on an electrostatic latent image carrying body, the developing device comprising: a vessel for holding the one-component type developer; a developer carrying body formed of a conductive material and rotatably provided in the vessel such that a portion of the developer carrying body is exposed therefrom and faces the electrostatic latent image carrying body so as to form a developing zone therebetween, the one-component type developer being adhered to a rotating surface of the developer carrying body with an electrostatic image force to be brought to the developing zone; a developer-feeding body formed of a conductive material and rotatably provided in the vessel so as to feed the one-component type developer to the developer carrying body, the developer-feeding body being in frictional engagement with the developer carrying body such that the one-component type developer fed thereto is subjected to triboelectrification therebetween; and a developer removing means mechanically engaged with the developer carrying body for removing the one-component type developer from the developer carrying body during movement of the one-component type developer from the developing zone to the developer-feeding body by the developer carrying body.

In this developing device, the developer carrying body may be formed as a developer carrying roller, and the developer removing means is formed as a metal-plate spring which is at least partially curved to be fitted for the developer carrying roller, and which is resiliently pressed thereagainst. Preferably, the metal-plate spring has a plurality of openings formed therein, and the openings are uniformly arranged along a longitudinal axis of the developer carrying roller. The metal plate spring may have a curvature somewhat smaller than that of the developer carrying roller.

In accordance with a third aspect of the present invention, there is provided a developing device for developing an electrostatic latent image with a one-component type developer, the electrostatic latent image being formed on an electrostatic latent image carrying body, the developing device comprising: a vessel for holding the one-component type developer; a developer carrying body formed of a conductive material and rotatably provided in the vessel such that a portion of the developer carrying body is exposed therefrom and faces the electrostatic latent image carrying body so as to form a developing zone therebetween, the one-component type developer being adhered to a rotating surface of the developer carrying body with an electrostatic image force to be brought to the developing zone; a developer-feeding body formed of a conductive material and rotatably provided in the vessel so as to feed the one-component type developer to the developer carrying body, the developer-feeding body being in frictional engagement with the developer carrying body such that the one-component type developer fed thereto is subjected to triboelectrification therebetween; a friction means engaged with the developer-feeding body such that the one-component type developer fed to the developer carrying body by the developer-feeding body is subjected to triboelectrification therewith; and a developer removing means mechanically engaged with the developer carrying body for removing the one-component type developer from the developer carrying body during movement of the one-component type developer from the developing zone to the developer-feeding body by the developer carrying body.

BRIEF DESCRIPTION OF THE DRAWINGS

Other objects and advantages of the present invention will be better understood from the following description, with reference to the accompanying drawings in which.

DESCRIPTION OF THE PREFERRED EMBODIMENTS

Figure 1:
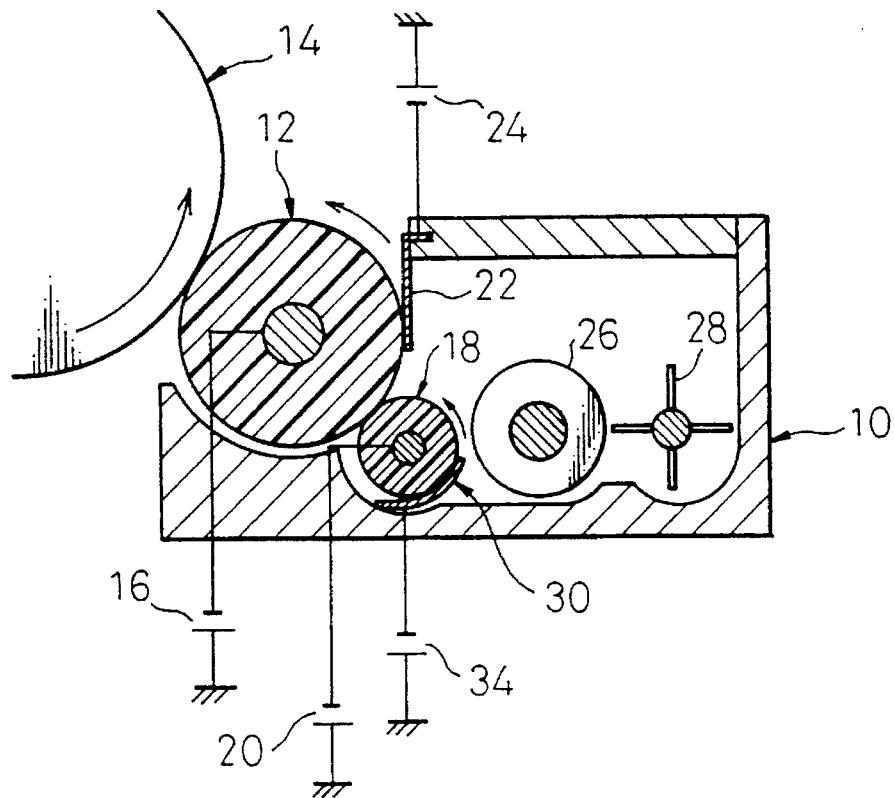
FIG. 1 is a schematic cross-sectional view showing a developing device according to a first aspect of the present invention.

FIG. 1 schematically shows a developing device using a non-magnetic one-component type developer, which is intended to be incorporated in an electrophotographic recording apparatus, such as a laser printer. The developing device comprises a vessel 10 for holding the one-component type developer. For example, the developer may be composed of polyester resin-based toner particles including an external additive of silica (0.5%), having an average diameter of 8 μm, and exhibiting a volume resistivity of about $4 \times 10^{14}$ Ωcm. The developing device also comprises a developing roller 12 rotatably provided in the vessel 10, and a portion of the developing roller 12 is exposed from the vessel 10. The exposed portion of the developing roller 12 faces an electrostatic latent image carrying body or photosensitive drum 14 so as to form a developing zone therebetween. The developing roller 12 and the photosensitive drum 14 are rotationally driven in the same direction as indicated by arrows in FIG. 1. The developing roller 12 is constituted as a conductive solid rubber roller which may be formed of polyurethane rubber, silicone rubber, nitrile rubber, or the like. When the developing roller 12 is produced by a suitable rubber material, a conductive substance, such as metal powder, carbon powder, or the like, is mixed with the rubber material so as to exhibit a volume resistivity of about $10^8$ $\Omega$cm. As shown in FIG. 1, the developing roller 12 is connected to an electrical power source 16, and a developing bias voltage of, for example, −300 volts is applied from the power source 16 to the developing roller 12.

The photosensitive drum 14 comprises a sleeve substrate made of a suitable conductive material, such as aluminum, and having a photoconductive film formed therearound. In this embodiment, although the photoconductive film is composed of an organic photoconductor (OPC), it may be a selenium photoconductor, an a-Si photoconductor, or the like. A uniform distribution of electrical charges is produced on a surface of the drum 14 by a charger, such as a corona discharger (not shown), and a potential of, for example, −600 volts is given the charged area of the drum 14. An electrostatic latent image is written on the charged area of the drum 14 by, for example, a laser beam scanner (not shown). In particular, the charged area of the drum 14 is scanned with a laser beam emitted from the laser beam scanner, along a direction of a central axis of the drum 14. During the scanning, the laser beam is switched on and off on the basis of binary image data obtained from, for example, a word processor, personal computer, or the like, so that an electrostatic latent image is written as a dot image on the charged area of the drum 14. Namely, when a zone of the charged area is irradiated by the laser beam, the charges are released from the irradiated zone so that a potential thereof is changed from about −600 volts to about −100 volts, whereby the latent image is formed as a potential difference between the irradiated zone (−100 volts) and the remaining zone (−600 volts).

The developing device further comprises a developer-feeding roller 18 provided in the vessel 10, and the developer-feeding roller 18 is in engagement with the developing roller 12 and is rotationally driven in the same direction as the developing roller 12, as indicated by an arrow in FIG. 1. The developer-feeding roller 18 is constituted as a conductive sponge roller which may be formed of suitable synthetic resin, such as polyurethane resin. When the conductive sponge roller 18 is produced by a suitable resin material, a conductive substance, such as metal powder, carbon powder, or the like, and a suitable foaming agent are mixed with the resin material. The conductive sponge roller or developer-feeding roller 18 is connected to an electrical power source 20, and a voltage of −400 volts is applied from the power source 20 to the developer-feeding roller 18. Note that the voltage (−400 volts) applied to the developer-feeding roller 18 is higher, by 100 volts, as an absolute value, than the developing bias voltage (−300 volts) applied to the developing roller 12.

As mentioned above, the developing roller 12 and the developer-feeding roller 18 are rotated in the same direction so that the surfaces thereof are rubbed up against each other in counter directions at a nip therebetween. The rotating surface of the developer-feeding roller 18 entrains toner particles and feeds the same from the body of developer to the nip between the developing roller 12 and the developer-feeding roller 18, and the fed toner particles are subjected to triboelectrification so that they are negatively charged. The negatively-charged toner particles are subjected to electrical forces, by which the toner particles are directed to the developing roller 12, due to the potential difference between the developing roller 12 and the developer-feeding roller 18. Then, the toner particles are electrostatically adhered to the rotating surface of the developing roller 12 due to the image forces acting therebetween, to thereby form a developer layer therearound. Then, the developing layer is brought to the developing zone for the development of the electrostatic latent images.

The developing device further comprises a doctor blade member 22 resiliently pressed against the surface of the developer roller 12 to make the thickness of the developer layer formed therearound uniform, to thereby ensure an even development of the latent images. The doctor blade member 22 is supported by the vessel 10, and is extended along the longitudinal axis of the developing roller 12. Preferably, the material of the doctor blade member 22 is selected such that the toner particles are given a negative charge by triboelectrification by the doctor blade member 22. To this end, the doctor blade member 22 may be constituted as a metal-plate spring of stainless steel. When the doctor blade member 22 is conductive, it is preferably connected to an electrical power source 24 such that a voltage of −400 volts, which is higher, by 100 volts as an absolute value, than the developing bias voltage (−300 volts), is applied from the power source 24 to the doctor blade member 22, whereby the toner particles can be negatively charged by a charge-injection effect. Note, in FIG. 1, reference numerals 26 and 28 indicate paddle rollers for moving the developer toward the developer-feeding roller 18.

During the developing process, as mentioned above, the developing bias voltage of −300 volts is applied from the power source 16 to the developing roller 12, and thus an electrical field produced between the latent image zone (about −100 volts) and the developing roller 12 and an electrical field produced between the remaining zone (about −600 volts) and the developing roller 12 are reverse with respect to each other. Accordingly, the negatively-charged toner particles are electrostatically adhered only to the latent image zone having the potential of about −100 volts, and thus the development of the latent image with the toner particles can be ensured.

Figure 2:
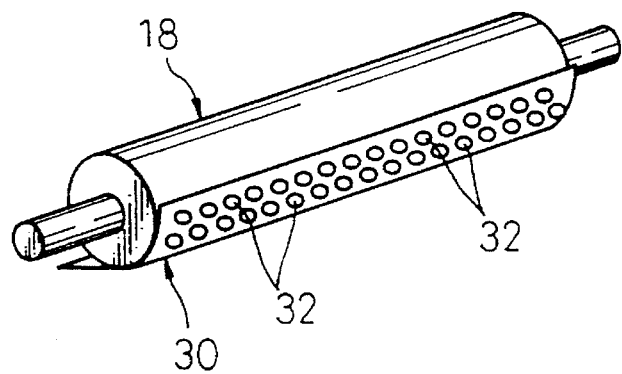
FIG. 2 is a schematic perspective view showing a developer-feeding roller to be incorporated in the developing device of FIG. 1, having a friction plate associated therewith.
Figure 3:
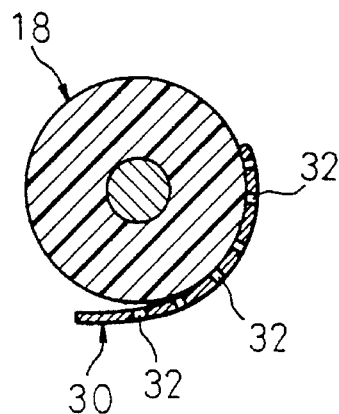
FIG. 3 is a cross-sectional view of the developer-feeding roller and the friction plate shown in FIG. 2.

According to a first aspect of the present invention, a friction plate 30 is provided in the vessel 10 to be in engagement with the developer-feeding roller 10. In this embodiment, the friction plate 30 is constituted as a plate spring formed of a stainless steel sheet having a thickness of about 1 mm, and the plate spring 30 is securely attached to a bottom of the vessel 10, and is shaped to partially surround the developer-feeding roller 18. Namely, as best shown in FIGS. 2 and 3, the plate spring or friction plate 30 is curved along the peripheral surface of the developer-feeding roller 18 such that the curved portion thereof is resiliently pressed against the developer-feeding roller 18. Also, as best shown in FIGS. 2 and 3, the friction plate 30 has a plurality of openings 32 formed therein, and these openings 32 are uniformly arranged along the longitudinal axis of the developer-feeding roller 18.

Due to the existence of the friction plate 30, it is possible to give a sufficient amount of electrical charge to the toner particles entrained by the developer-feeding roller 18. In particular, the toner particles entrained by the rotating sponge surface of the developer-feeding roller 18 are subjected to triboelectrification not only between the roller 18 and the friction plate 30 but also between the developing roller 12 and the roller 18. Thus, it is possible to give a sufficient amount of electrical charge not only to the small toner particles but also to the large toner particles. The sufficiently-charged toner particles having the large diameter are electrostatically adhered to the developer-feeding roller 18 with a large image force. Accordingly, not only the small toner particles but also the large toner particles can pass the gap between the developer-feeding roller 18 and the doctor blade member 22 during the regulation of the developer layer by the doctor blade member 22.

The penetration of the toner particles into the sponge material of the developer-feeding roller 18 is prevented by the plurality of openings 32 formed in the friction plate 30. In particular, when the toner particles are introduced between the developer-feeding roller 18 and the friction plate 30, they have a tendency toward penetrating into the sponge material of the developer-feeding roller 18. Accordingly, the toner particles penetrate into the sponge material, but the penetrated toner particles are extracted out of the sponge material through the openings 32 of the friction plate 30. In other words, the toner particles are prevented from being deeply embedded into the sponge material of the developer-feeding roller 18 due to the openings 32 of the friction plate 30. Note, if the toner particles are deeply penetrated into the sponge material of the developer-feeding roller 18, an elasticity thereof is lost so that not only an ability to entrain the toner particles by the developer-feeding roller 18 is lowered, but also an ability to electrically charge the toner particles by triboelectrification with the developer-feeding roller 18 is deteriorated.

Figure 4:
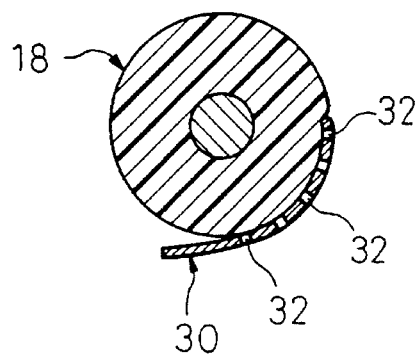
FIG. 4 is a cross-sectional view similar to FIG. 3, showing a modification of the friction plate.

The curved portion of the friction plate 30 may have a smaller curvature than that of the developer-feeding roller 18. In this case, a free edge of the friction plate 30 somewhat bites into the sponge material of the developer-feeding roller 18, as shown in FIG. 4, whereby not only the extraction of the penetrated toner particles from the sponge material can be facilitated, resulting in prolongation of the developer-feeding roller 18, but also the triboelectrification of the toner particles can be enhanced. Note, in the friction plate 30 shown in FIG. 4, the free edge thereof should be rounded or chamfered to thereby protect the surface of developer-feeding roller 18 from being damaged.

Figure 5:
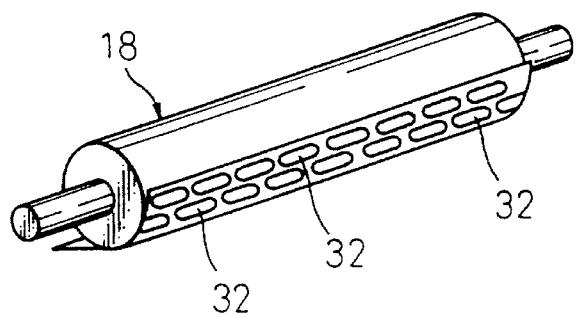
FIG. 5 is a perspective view similar to FIG. 2, showing another modification of the friction plate.

In FIG. 2, although the openings 32 of the friction plate 30 are each shown as being a circular hole, they may be formed as an elongated hole, as shown in FIG. 5. Furthermore, the openings 32 may have another shape such as an oval, a rectangular, a suitable polygon or the like. To charge homogeneously the toner particles entrained by the developer-feeding roller 18, the opening 32 should be uniformly arranged along the circumferential direction of the developer-feeding roller 18. Namely, when the friction plate 30 is circumferentially divided into strip-like segments at regular intervals, a total area of the opening zones included in each of the divided segments should be constant.

Preferably, the friction plate 30 is connected to an electrical power source 34 such that a voltage of −500 volts, which is higher by 100 bolts as an absolute value, than the voltage (−400 volts) applied to the developer-feeding roller 18, is applied from the power source 34 to the friction plate 30, whereby the toner particles can be negatively charged by a charge-injection effect. In this case, in addition to the triboelectrification with the friction plate 30, the toner particles are further charged by the charge-injection effect.

Figure 6:
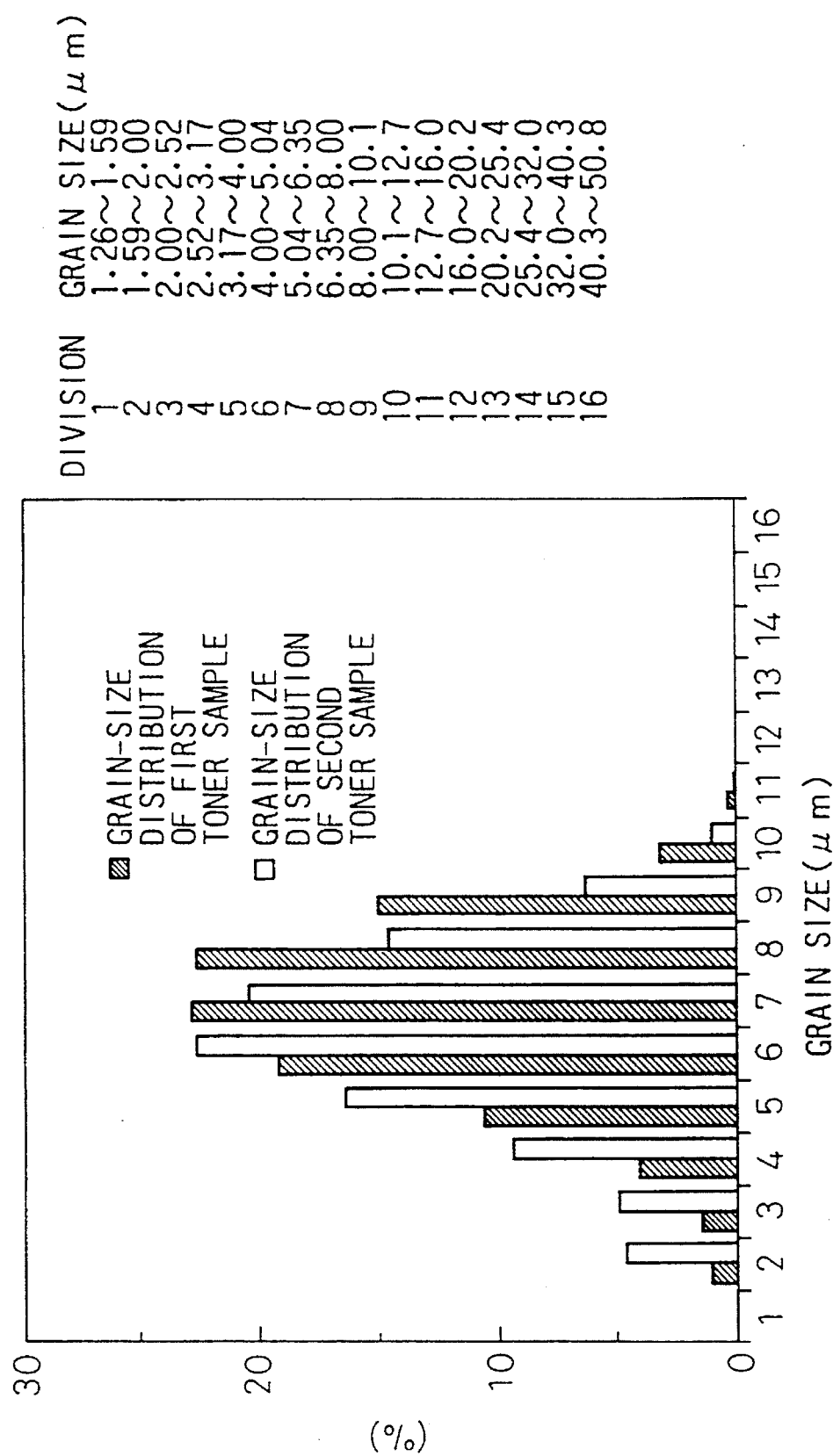
FIG. 6 is a bar graph showing a characteristic of the developing device of FIG. 1.

An experiment was carried out to evaluate the developing device of FIG. 1 according to the first aspect of the present invention. In particular, a given amount of fresh one-component type developer was loaded in the vessel 10, and then the developing device was operated over a period of several minutes to form a developer layer around the developing roller 12. Then, a first sample of toner was obtained from the fresh developer held in the vessel 10, and a second sample of toner was obtained from the developer layer just regulated by the doctor blade member 22. The distribution of grain size of the toner particles included in the first toner sample and a distribution of grain size of the toner particles included in the second sample were determined. The results are shown in a bar graph of FIG. 6. In this bar graph, a series of hatched bars represents the distribution of grain size derived from the first toner sample, and a series of empty bars represents the distribution of grain size derived from the second toner sample. The abscissa of the bar graph of FIG. 6 is divided into sixteen divisions numbered by 1 to 16, and the respective divisions 1 to 16 correspond to ranges of grain size which are shown as a column on the right side of the bar graph of FIG. 6, respectively. For example, the division 6 represents the toner particles having a diameter of 4.00 to 5.04 μm, and the division 7 represents the toner particles having a diameter of 5.04 to 6.35 μm.

Also, an experiment was carried out in the same manner as mentioned, to evaluate a conventional developing device corresponding to the developing device of FIG. 1 from which the friction plate 30 is eliminated. The results are shown in a bar graph of FIG. 7. The particulars stated with reference to the bar graph of FIG. 6 are true for the bar graph of FIG. 7.

As is apparent from the FIG. 6, the distribution of grain size derived from the first toner sample is substantially in accord with the distribution of grain size derived from the second toner sample. This proves that the toner particles having the large diameter can be sufficiently charged by the triboelectrification with the friction plate 30, and thus that, not only the small toner particles, but also the large toner particles can pass the gap between the developer-deeding roller 18 and the doctor blade member 22 during the regulation of the developer layer by the doctor blade member 22. According to the first aspect of the present invention, a constant definition or quality of a developed toner image can be ensured until the loaded developer is finally consumed.

Figure 7:
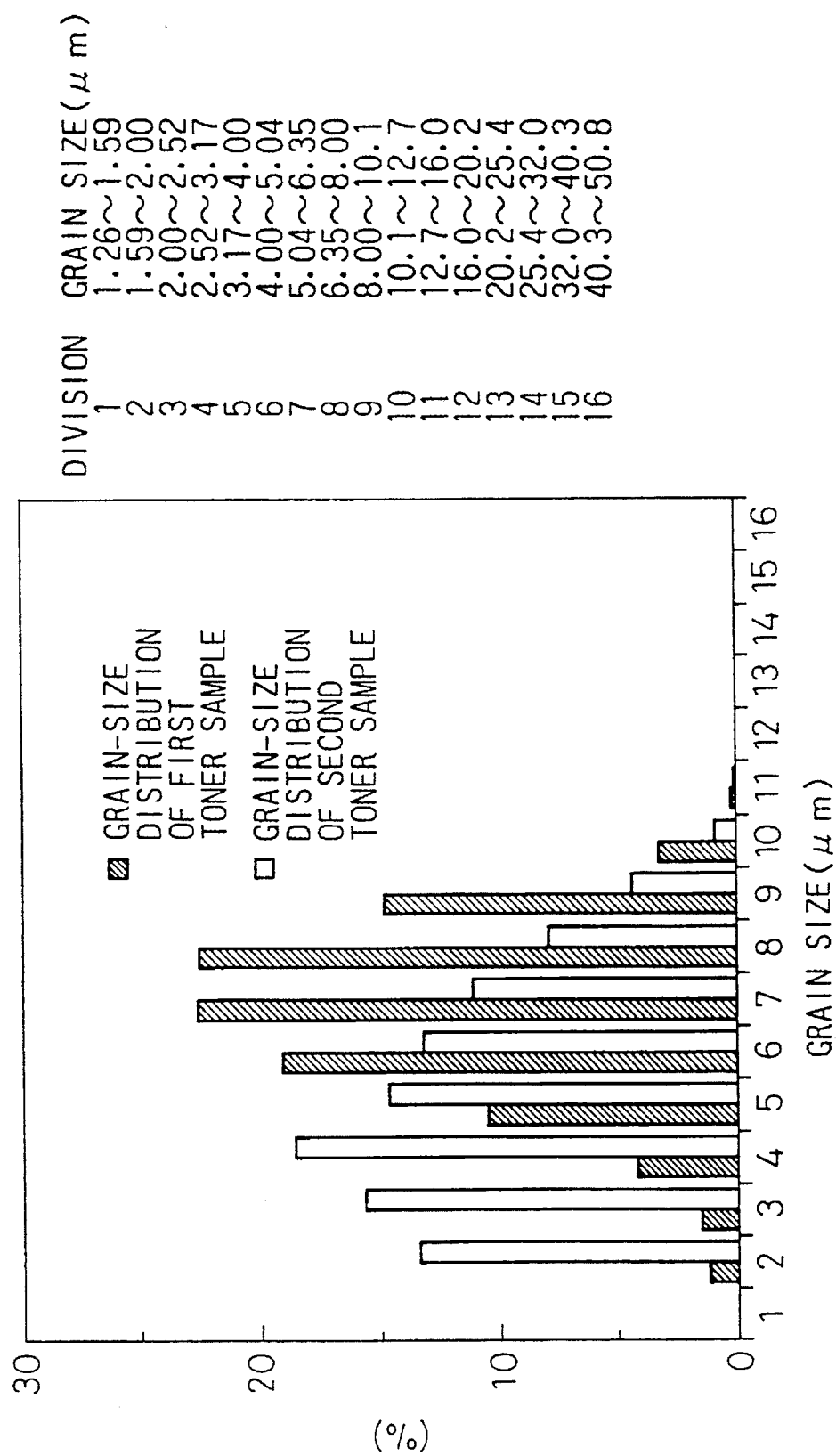
FIG. 7 is a bar graph showing a characteristic of an conventional developing device.

On the contrary, in the conventional developing device, the toner particles having a smaller diameter are preferentially consumed from the body of developer held in the vessel, as shown in the bar graph of FIG. 7. Accordingly, a definition or quality of a developed toner image is gradually deteriorated as more developer is consumed.

An experiment was carried out to evaluate a stickiness of toner particle to the doctor blade 22 in the developing device of FIG. 1. In this experiment, the developing device was independently run without being incorporated in an electrophotographic recording apparatus such as a laser printer. In this case, the developer layer formed around the developing roller 12 is not at all consumed for development of latent images, and thus the toner particles included the developer layer are excessively stressed, resulting in a premature stickiness of toner particles to the doctor blade member 22. In this experiment, a stickiness of toner particles to the doctor blade member 22 occurred after a running time of about 10.5 hours.

Also, an experiment was carried out in the same manner as mentioned above, to evaluate a stickiness of toner particle to the doctor blade in the conventional developing device. In this experiment, a stickiness of toner particles to the doctor blade member occurred after a running time of about 3 hours.

Thus, the comparison between both the experiments proves that the toner particles having the large diameter can be sufficiently charged by the triboelectrification with the friction plate 30, so that the toner particles are steadily adhered to the developing roller 12.

Figure 8:
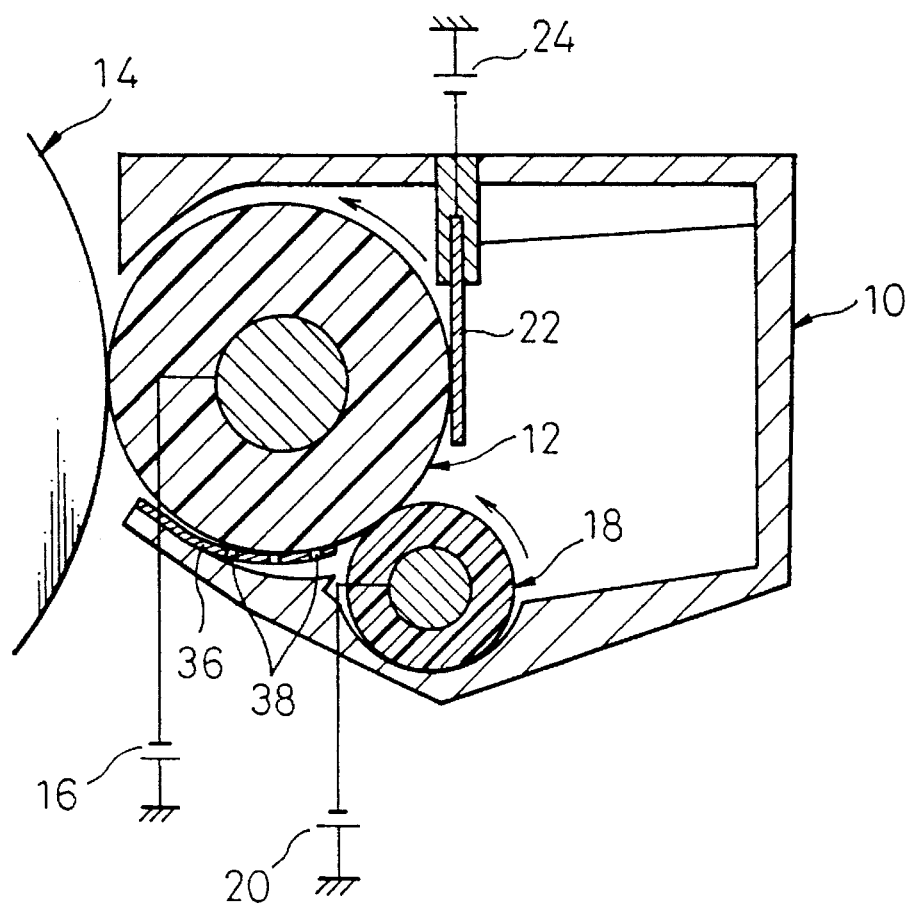
FIG. 8 is a schematic cross-sectional view showing a developing device according to a second aspect of the present invention.

FIG. 8 schematically shows a developing device according to a second aspect of the present invention, which is generally similar to the developing device shown in FIG. 1. In FIG. 8, the same references as in FIG. 1 represent the same elements.

Figure 9:
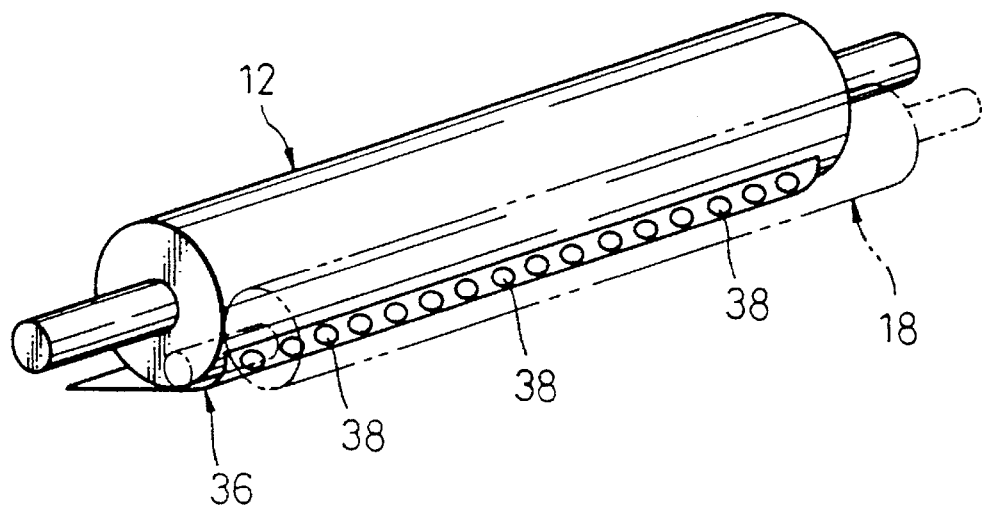
FIG. 9 is a schematic perspective view showing a developing roller to be incorporated in the developing device of FIG. 8, having a developer-removing plate and a developer-feeding roller associated therewith.
Figure 10:
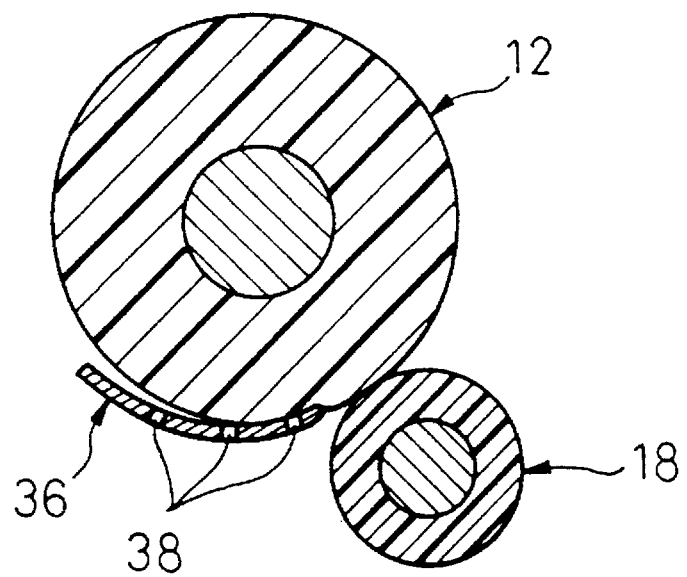
FIG. 10 is a cross-sectional view showing the developing roller, the developer-removing plate, and the developer-feeding roller shown in FIG. 9.

As shown in FIG. 8, according to the second aspect of the present invention, a developer-removing plate 36 is provided in the vessel 10 to be in engagement with the developing roller 12. In this embodiment, the developer-removing plate 36 is constituted as a plate spring formed of a stainless steel sheet having a thickness of about 0.1 mm, and the plate spring 36 is securely attached to a bottom of the vessel 10, and is shaped to partially surround the developing roller 12. Namely, as best shown in FIGS. 9 and 10, the plate spring or developer-removing plate 36 is curved along the peripheral surface of the developing roller 12 such that the curved portion thereof is resiliently pressed against the developing roller 12. Also, as best shown in FIG. 9, the developer-removing plate 36 has a plurality of openings 38 formed therein, and these openings 38 are uniformly arranged along the longitudinal axis of the developing roller 12.

By engaging the developer-removing plate 36 with the developing roller 12, residual toner particles not used for development of latent images can be removed from the developing roller 12. Namely, the residual toner particles are scraped from the developing roller 12 through the openings 38 of the developer-removing plate 36. In FIG. 9, although the openings 38 of the developer-removing plate 36 are shown as a circular hole, they may be formed as an elongated hole. Furthermore, the openings 36 may have another shape such as an oval, a rectangular, a suitable polygon or the like. To remove homogeneously the toner particles from the developing roller 12, the opening 38 should be uniformly arranged along the circumferential direction of the developing roller 12. Namely, when the developer-removing plate 36 is circumferentially divided into strip-like segments at regular intervals, a total area of the opening zones included in each of the divided segments should be constant.

The curved portion of the developer-removing plate 36 may have a smaller curvature than that of the developing roller 12. In this case, a free edge of the developer-removing plate 36 somewhat bites into the rubber material of the developing roller 12, as shown in FIG. 10, whereby the removal of the residual toner particles from the developing roller 12 can be facilitated. Note, in the developer-removing plate 36 shown in FIG. 10, the free edge thereof should be rounded or chamfered to thereby protect the surface of developing roller 12 from being damaged.

In a conventional developing device corresponding to the developing device of FIG. 8 from which the developer-removing plate 36 is eliminated, the developing hysteresis appears in the developing layer formed around the developing roller when developing an electrostatic latent image pattern except for a character latent image, such as an alphabet image, a numerical image, a symbol image, or the like, a solid-image pattern or a halftone-dot-image pattern. As stated hereinbefore, the developing hysteresis may be defined as an unevenness of a density of toner particles produced in the developer layer in accordance with a shape of a developed solid-image pattern or a developed halftone-dot-image pattern, and the appearance of the developing hysteresis results in an occurrence of the earlier-developed image pattern, as a ghost pattern in a later-developed toner image pattern.

Figure 11:
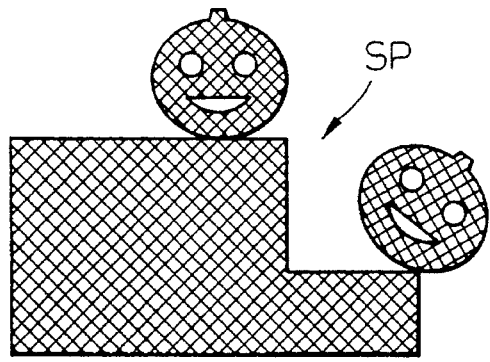
FIG. 11 is a view for explaining a developing hysteresis, showing an developed solid-image pattern.

For example, when an electrostatic latent image pattern is developed as a solid-image pattern SP (illustrated as a cross-hatched pattern) as shown in FIG. 11, toner particles are consumed from a zone of the developer layer which corresponds to a shape of the solid-image pattern SP. Namely, the zone from which the toner particles are consumed and the remaining zone from which the toner particles are not consumed appear in the developer layer, and the toner-consumed zone may be defined as a depleted zone. When the residual remaining toner particles not used for development of latent images meet the developer-feeding roller, a part of residual toner particles is once removed therefrom, but fresh toner particles are immediately supplied thereto. At this time, the toner-consumed or depleted zone is also supplied with fresh toner particles. Although the developer layer made of the supplied fresh toner particles is regulated by the doctor blade member, the regulated developer layer cannot exhibit an evenness of a density of toner particles. In other words, an unevenness of a density of toner particles is produced in the regulated developer layer in accordance with the shape of the solid-image pattern SP. This phenomenon is called developing hysteresis.

Figure 12:
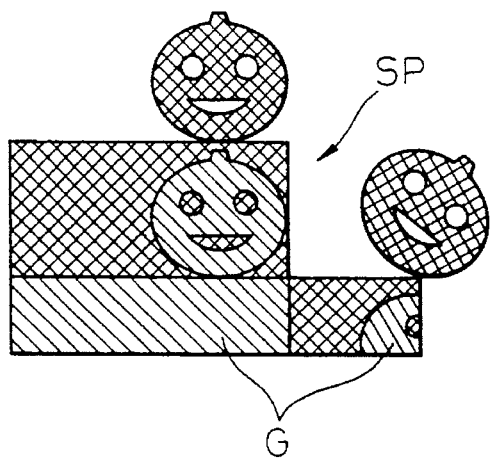
FIG. 12 is a view for explaining an occurrence of a negative ghost in an developed solid-image pattern.
Figure 13:
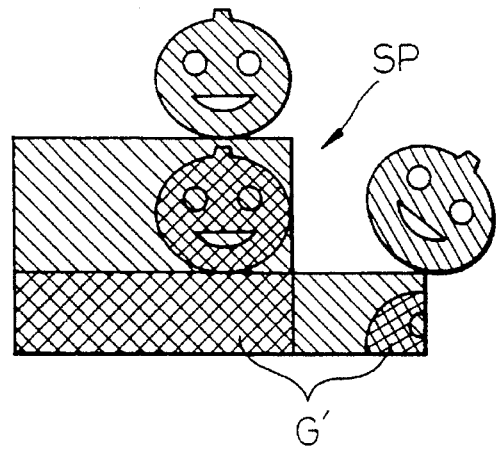
FIG. 13 is a view for explaining an occurrence of a positive ghost in an developed solid-image pattern.

When an electrostatic latent image pattern having a shape corresponding to that of the solid-image pattern shown in FIG. 11 is developed by the developer layer exhibiting developing hysteresis, the earlier-developed solid-image pattern SP (FIG. 11) occurs as a ghost pattern G, G' in the later-developed solid-image pattern SP as shown in FIG. 12 or FIG. 13. The ghost pattern G (illustrated as a hatched pattern in FIG. 12) has a density of development which is lower than that of the later-developed solid-image pattern SP (illustrated as a cross-hatched pattern in FIG. 12), and this ghost pattern G is defined as a negative ghost pattern. An occurrence of the negative ghost pattern results from the fact that an electrical charge of the developer is insufficient. The ghost pattern G' (illustrated as a cross-hatched pattern in FIG. 13) has a density of development which is higher than that of the later-developed solid-image pattern SP (illustrated as a hatched pattern in FIG. 13), and this ghost pattern G' is defined as a positive ghost pattern. The occurrence of the positive ghost pattern results from the fact that an electrical charge of the developer is too high.

According to the second aspect of the present invention, the residual toner particles not used for development of latent images are removed from the developing roller 12 by the developer-removing plate 36, and a new developer layer is formed around the developing roller 12 using fresh toner particles. Thus, it is possible to prevent the appearance of the developing hysteresis in the developer layer, resulting in no ghost pattern in a developed solid-image or halftone-dot-image pattern.

In the conventional developing device corresponding to the developing device of FIG. 8 in which the developer-removing plate 36 is not used, a developing process was carried out to obtain a developed solid-image pattern (SP), as shown in FIG. 11, and thus a developer layer exhibiting the developing hysteresis was formed around the developer roller. A maximum differential density of toner particles between two local areas corresponding to the toner-consumed zone and the remaining zone was measured, and the measured result was 22 g/m². Then, a developed solid-image pattern (SP) having a negative ghost, as shown in FIG. 12, was obtained. The differential optical density of development corresponding to the maximum differential density of toner particles was measured, and the measured result was 0.2 (ΔOD). This differential optical density of development is clearly visible to the eye.

Similarly, in the developing device shown in FIG. 8, a developing process was carried out to obtain a developed solid-image pattern (SP) as shown in FIG. 11, and thus a developer layer exhibiting developing hysteresis was formed around the developer roller 12. A maximum differential density of toner particles between two local areas corresponding to the toner-consumed zone and the remaining zone was measured, and the measured result was 4 g/m². Then, a developed solid-image pattern (SP), as shown in FIG. 12, was obtained. The differential optical density of development corresponding to the maximum differential density of toner particles was measured, and the measured result was 0.05 (ΔOD). This differential optical density of development was not visible to the eye.

Also, the developing device of FIG. 8 was independently run over a period of about 10 hours, and then the surface roughness (Rz) of the developing roller 12 was measured. The measured result was as follows:

Rz=9.2

Similarly, the conventional device was independently and continuously run over a period of about 10 hours, and then the surface roughness (Rz) of the developing roller was measured. The measured result was as follows:

Rz=7.6

As is well known, the larger the value of surface roughness, the higher a degree of surface roughness. Accordingly, the experiments prove that a film of toner particles on the surface of the developing roller was prematurely produced in the conventional developing device.

Furthermore, in the conventional developing device, a developed solid-image pattern (SP) having a positive ghost as shown in FIG. 13 was obtained by changing the developer-charging-conditions. On the other hand, in the developing device of FIG. 8, a developing process was carried out under the same developer-charging-conditions. However, there was no occurrence of positive ghost, and the differential optical density of development was less than 0.03 (ΔOD). In addition, on each of the conventional developing device and the developing device of FIG. 8, an independent and continuous ten-hour running experiment was performed, and a surface roughness of the developing roller was measured. The results are as follows:

Rz=7.6 (Conventional Device)

Rz=11.3 (Device of FIG. 8)

According to a third aspect of the present invention, in the developing device of FIG. 1, a developer-removing plate 36 as shown in FIG. 8 is applied to the developing roller, and, in the developing device of FIG. 8, a friction plate 30 as shown in FIG. 1 is applied to the developer-feeding roller. Thus, in accordance with the third aspect of the present invention, all of the issues as discussed can be resolved.

Figure 14:
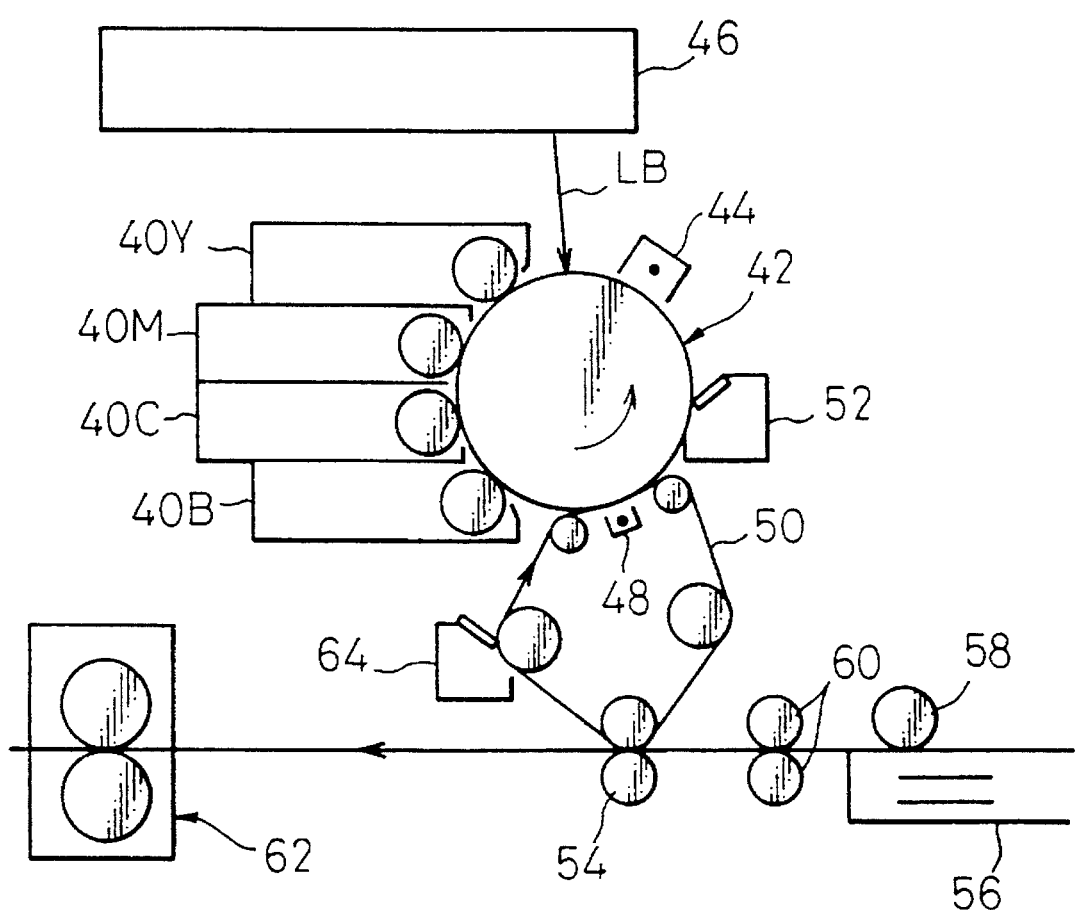
FIG. 14 is a schematic view showing a full-color laser printer in which the developing devices are incorporated.

FIG. 14 schematically shows a full-color laser printer in which four developing devices according to the present invention are incorporated, and the developing devices are indicated by references 40Y, 40M, 40C, and 40B. In the respect developing devices 40Y, 40M, 40C, and 40B, a one-component type developer composed of only yellow toner, a one-component type developer composed of only magenta toner, a one-component type developer composed of only cyan toner, and a one-component type developer composed of only black toner are used. These developing devices 40Y, 40M, 40C, and 40B are circumferentially arranged with respect to a photosensitive drum 42 which is rotationally driven in a direction indicated by the arrow in FIG. 14. A uniform distribution of electrical charges is produced on a surface of the drum 42 by a charger, such as a corona discharger 44, and an electrostatic latent image is written in the charged area of the drum 42 with a laser beam LB emitted from a laser beam scanner 46. First, writing of an electrostatic latent image is carried out on the basis of yellow image data, and this latent image is developed as a charged yellow toner image by the developing device 40Y. The yellow toner image is electrostatically transferred from the drum 42 to a transfer belt 50 by a transfer charger, such as a corona discharger 48. The transfer belt 50 is formed of a suitable dielectric material, and is run along five guide rollers in a direction indicated by an arrow in FIG. 14. The transfer charger 48 gives the transfer belt 50 an electrical charge having a polarity opposite to that of the charged yellow toner image, and thus the transfer of the yellow toner image from the drum 42 to the transfer belt 50 is carried out.

After a residual yellow toner not used for the development of the latent image is removed from the surface of the photosensitive drum 42 by a cleaner 52, a uniform distribution of electrical charges is again produced on the surface of the drum 42 by the corona discharger 44. Then, a writing of an electrostatic latent image is carried out on the basis of magenta image data, and this latent image is developed as a charged magenta toner image by the developing device 40M. The magenta toner image is electrostatically transferred from the drum 42 to the transfer belt 50 by the corona discharger 48 such that the magenta toner image is superimposed on the yellow toner image. Similarly, a cyan toner image and a black toner image are successively obtained by the developing devices 40C and 40B, and are then superimposed on the magenta and yellow toner images. Thus, a full-color toner image is formed on and held by the transfer belt 50, and then is electrostatically transferred from the transfer belt 50 to a sheet of paper by a transfer roller 54 engaged with one of the five guide rollers. In particular, the sheet of paper is fed from a paper supply cassette 56 by a paper feeder roller 58 incorporated in the cassette 56. The fed sheet of paper is stopped at a pair of register rollers 60, 60, and is then introduced into the nip between the transfer roller 54 and the guide roller engaged therewith, at a given timing, so that the full-color toner image can be electrostatically transferred from the transfer belt 50 to the sheet of paper. The sheet of paper carrying the transferred full-color toner image is moved toward a heat-roller type fixing device 62, and the full-color toner image is thermally fused and fixed on the sheet of paper. In FIG. 14, reference 64 indicates a cleaner for the transfer belt 50, and the cleaner 64 serves to remove residual toner, not transferred to the sheet of paper, from the transfer belt 50.

Although the developing devices according to the present invention are constituted such that the developer is negatively charged, they may be modified so as to give the developer the positive charge. In this case, materials of the various elements of the developing device are selected on the basis of the triboelectric series so as to ensure a positive charge on the developer.

Finally, it will be understood by those skilled in the art that the foregoing description is of preferred embodiments of the present invention, and that various changes and modifications can be made thereto without departing from the spirit and scope thereof.

We claim:

1. A developing device for developing an electrostatic latent image with a one-component type developer, the electrostatic latent image being formed on an electrostatic latent image carrying body, said developing device comprising:

a vessel for holding the one-component type developer;

a developer carrying body formed of a conductive material and rotatably provided in said vessel such that a portion of said developer carrying body is exposed therefrom and faces the electrostatic latent image carrying body so as to form a developing zone therebetween, the one-component type developer being adhered to a rotating surface of said developer carrying body with an electrostatic image force to be brought to said developing zone;

a developer-feeding roller formed of a conductive material and rotatably provided in said vessel so as to feed the one-component type developer to said developer carrying body, said developer-feeding roller being in frictional engagement with said developer carrying body such that the one-component type developer fed thereto is subjected to triboelectrification therebetween; and a friction means engaged with said developer-feeding body, said friction means being formed as a metal plate spring resiliently pressed against said developer feeding roller, said metal plate spring being at least partially curved to be fitted to said developer-feeding roller such that the one-component type developer fed to said developer carrying body by said developer-feeding roller is subjected to triboelectrification therewith.

2. A developing device as set forth in claim 1, wherein the friction metal plate spring has a plurality of openings formed therein, and said openings are uniformly arranged along a longitudinal axis of said developer-feeding roller.

3. A developing device as set forth in claim 1, wherein the friction metal plate spring has a curvature somewhat smaller than that of said developer-feeding roller.

4. A developing device as set forth in claim 3, wherein the friction metal plate spring has a plurality of openings formed therein, and said openings are uniformly arranged along a longitudinal axis of said developer-feeding roller.

5. A developing device as set forth in claim 1, wherein said metal plate spring has an electrical conductivity, and is connected to an electrical power source so as to be given a predetermined potential, to thereby direct the one-component type developer from said metal plate spring to said developer-feeding body.

6. A developing device for developing an electrostatic latent image with a one-component type developer, the electrostatic latent image being formed on an electrostatic latent image carrying body, said developing device comprising:

a vessel for holding the one-component type developer;

a developer carrying body formed of a conductive material and rotatably provided in said vessel such that a portion of said developer carrying body is exposed therefrom and faces the electrostatic latent image carrying body so as to form a developing zone therebetween, the one-component type developer being adhered to a rotating surface of said developer carrying body with an electrostatic image force to be brought to said developing zone;

a developer-feeding roller formed of a conductive material and rotatably provided in said vessel so as to feed the one-component type developer to said developer carrying body, said developer-feeding body being in frictional engagement with said developer carrying body such that the one-component type developer fed thereto is subjected to triboelectrification therebetween; and a developer removing means formed as a metal plate spring resiliently pressed against said developer carrying roller, said metal plate spring being at least partially curved to be fitted to said developer carrying roller for removing the one-component type developer from said developer carrying roller during movement of the one-component type developer from said developing zone to said developer-feeding roller by said developer carrying roller.

7. A developing device as set forth in claim 6, wherein said metal plate spring has a plurality of openings formed therein, and said openings are uniformly arranged along a longitudinal axis of said developer carrying roller.

8. A developing device as set forth in claim 6, wherein said metal plate spring has a curvature somewhat smaller than that of said developer carrying roller.

9. A developing device as set forth in claim 8, wherein said metal plate spring has a plurality of openings formed therein, and said openings are uniformly arranged along a longitudinal axis of said developer carrying roller.

10. A developing device for developing an electrostatic latent image with a one-component type developer, the electrostatic latent image being formed on an electrostatic latent image carrying body, said developing device comprising:

a vessel for holding the one-component type developer;

a developer carrying roller formed of a conductive material and rotatably provided in said vessel such that a portion of said developer carrying roller is exposed therefrom and faces the electrostatic latent image carrying body so as to form a developing zone therebetween, the one-component type developer being adhered to a rotating surface of said developer carrying roller with an electrostatic image force to be brought to said developing zone;

a developer-feeding roller formed of a conductive material and rotatably provided in said vessel so as to feed the one-component type developer to said developer carrying roller, said developer-feeding roller being in frictional engagement with said developer carrying roller such that the one-component type developer fed thereto is subjected to triboelectrification therebetween;

a friction means engaged with said developer-feeding body, said friction means being metal plate spring resiliently pressed against said developer feeding roller, said metal plate spring being at least partially curved to be fitted to said developer-feeder roller such that the one-component type developer fed to said developer carrying body by said developer-feeding body is subjected to triboelectrification therewith; and a developer removing means formed as a metal plate spring resiliently pressed against said developer carrying roller, said metal plate spring being at least partially curved to be fitted to said developer carrying roller for removing the one-component type developer from said developer carrying roller during movement of the one-component type developer from said developing zone to said developer-feeding roller by said developer carrying roller.

* * * * *